United States Patent
Ramer

Patent Number: 5,934,578
Date of Patent: Aug. 10, 1999

[54] ROTARY DRUM BALE CUTTER WITH REPROCESSING CHAMBER

[75] Inventor: Heber M. Ramer, Harper, Kans.

[73] Assignee: Harper Industries, Inc., Harper, Kans.

[21] Appl. No.: 09/020,834

[22] Filed: Feb. 9, 1998

[51] Int. Cl.⁶ .................................................. B02C 19/12
[52] U.S. Cl. ...................... 241/29; 241/101.76; 241/605
[58] Field of Search ................................ 241/29, 30, 605, 241/101.76; 414/24.6, 24.5

[56] References Cited

U.S. PATENT DOCUMENTS

| | | |
|---|---|---|
| 2,561,069 | 7/1951 | Peterson . |
| 2,670,775 | 3/1954 | Elofson . |
| 2,685,900 | 8/1954 | Cross . |
| 2,978,191 | 4/1961 | Kingery . |
| 3,101,759 | 8/1963 | Sterner et al. . |
| 3,208,491 | 9/1965 | Bliss . |
| 3,392,769 | 7/1968 | Grönberg . |
| 3,738,584 | 6/1973 | Gronberg . |
| 3,915,392 | 10/1975 | Kugler . |
| 4,266,899 | 5/1981 | Skeem . |
| 4,657,191 | 4/1987 | Dwyer et al. . |
| 4,732,332 | 3/1988 | Schitemaker . |
| 4,830,292 | 5/1989 | Frey . |
| 4,844,353 | 7/1989 | Houle . |
| 4,934,615 | 6/1990 | Osborne . |
| 4,951,883 | 8/1990 | Loppoli et al. . |
| 5,090,630 | 2/1992 | Kopecky et al. . |
| 5,368,238 | 11/1994 | Bergkamp et al. . |
| 5,803,375 | 9/1998 | Hartwig ................................... 241/605 |

FOREIGN PATENT DOCUMENTS 2749256  10/1978  Germany ................................ 241/605

Primary Examiner—Mark Rosenbaum
Attorney, Agent, or Firm—Litman, Kraai & Brown L.L.C.

[57] ABSTRACT

A round bale cutter has an open bale loading side and a cut hay exhaust side with a bale receiving area on a floor in between. The cutter includes a housing with a gap on the hay exhaust side extending the length of the machine just above the floor and a hay reprocessing chamber attached to housing and extending outward and downward from the gap. A rotary cutter drum equipped with knives about its periphery is supported on a drive shaft which extends from end to end of the housing, with the cutter drum being positioned in the gap in contact with a hay bale in the bale receiving area. The hay bale is initially cut by the drum, propelling cut hay strands into the hay reprocessing chamber where they circulate long enough to hit the rotary drum knives again. The twice cut strands, which are small enough to be used in feed mixing operations, are then expelled through an exhaust side opening in the hay reprocessing chamber.

13 Claims, 3 Drawing Sheets

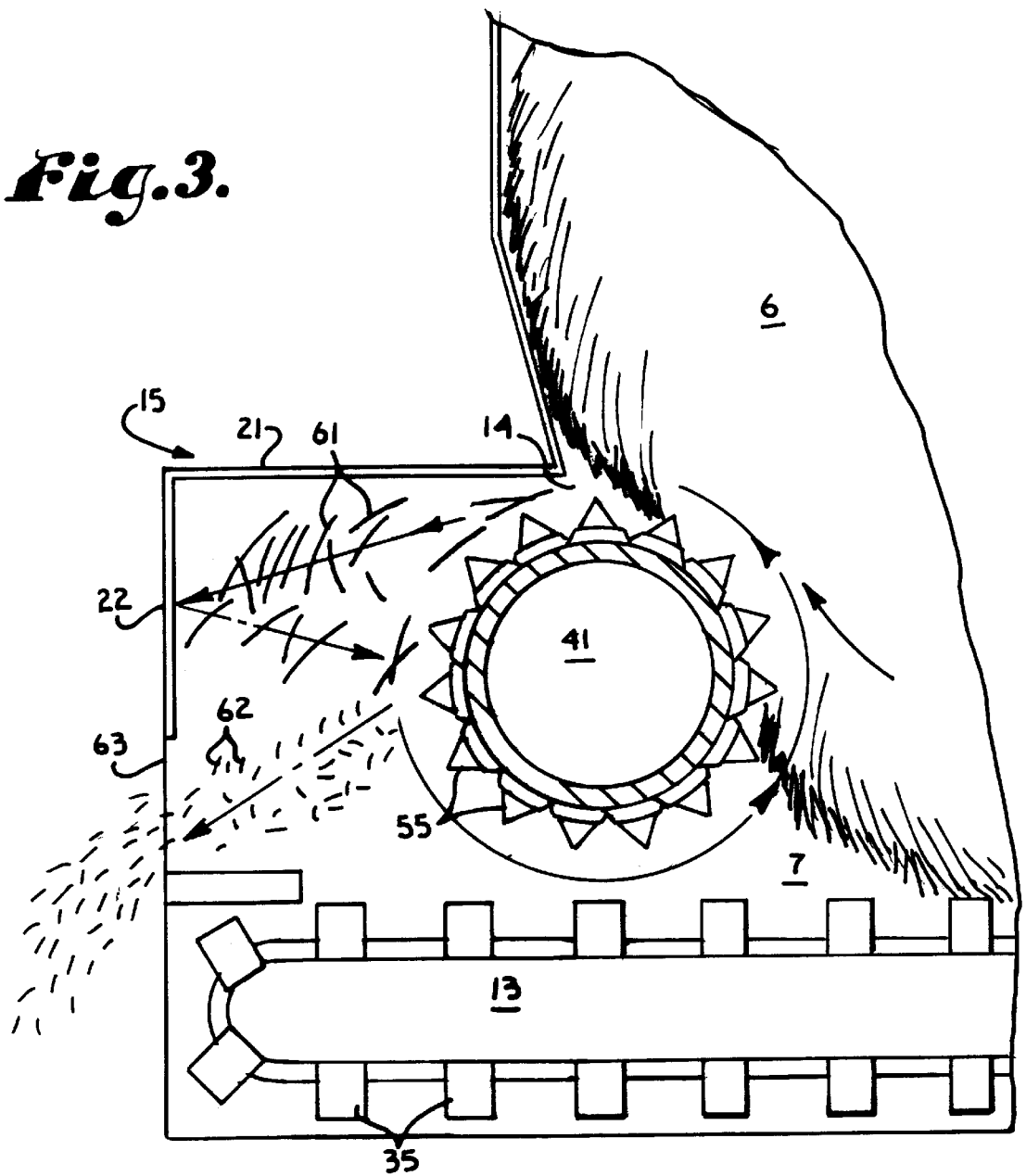

ROTARY DRUM BALE CUTTER WITH REPROCESSING CHAMBER

BACKGROUND OF THE INVENTION

1. Field of the Invention

This invention is directed to a round bale rotary cutter with a hay reprocessing chamber positioned just outside of the rotary cutter drum. As a round hay bale is fed into the rotary cutter drum by a conveyor, a first side of the rotary cutter drum initially cuts the hay into fairly long strands which are then thrown into the hay reprocessing chamber where they encounter the other side of the drum. The strands are thus re-cut within the hay reprocessing chamber to yield shorter strands.

2. Description of the Related Art

In the past, hay for feeding livestock was cut and baled into relatively small, rectangularly shaped hay bales which were usually stored indoors in barns or other storage buildings. When the hay was needed for feeding cattle, a desired number of these small hay bales were removed from storage, brought to the livestock and broken open for feeding.

This method of storing hay in small bales has been largely replaced by the use of large round bales weighing upwards of 2000 lbs each. Often these round bales are simply left in the field and are moved only as they are needed for feeding. A problem with such large bales is that, in relatively small livestock operations, the entire bale may not be needed for feed at any one time. Even in larger farming operations, a single bale may be sufficient to feed livestock in more than one location. Thus, these bales cannot simply be carried to the livestock and broken open as were the small rectangular bales in the past.

Generally, two feeding methods have developed for feeding round bales to livestock. In a first method, the bales are placed in fixed round bale feeders which are designed to give the livestock feeding access to the bale, but which protect the bale from being trampled or otherwise destroyed by the feeding livestock. With such a round bale feeder, the bale can remain in place for extended periods to feed surrounding livestock.

In a second method, an apparatus is used which cuts the round bale into manageable portions and distributes the cut hay along the ground or into feeding bins for livestock to reach. For specialized feeding operations, such as for dairy cattle or feed lots, for example, the hay must generally be cut into short strands to be mixed with additives and other feed ingredients to promote optimum milk production or rapid growth.

In the past, in order to cut the hay into small enough strands, typically on the order of 8" or less, to be usable with a feed mixture it was necessary to employ a high speed rotary cutter so that individual strands of hay were impacted by knives on the cutting wheel a number of times before being expelled from the cutter. For PTO driven systems, in order to drive a cutting drum at this high a speed, e.g. 2000 RPM and above, a relatively high horsepower, and thus fairly expensive, tractor was required. Furthermore, running cutting drums at such high speeds greatly increases hazards to the operator and bystanders, increases equipment wear and maintenance requirements and shortens equipment life. In order to achieve the required strand length in prior art rotary cutters, it was also necessary to slow down the bale conveyor speed, thus slowing overall hay processing speed. Finally, ordinary rotary cutters expel cut hay strands at high speed through a large exhaust opening such that hay strands are flying in multiple directions, making it difficult to direct the cut hay into a confined space, such as a feed bin or a mixing chamber.

It is clear then, that a need exists for a rotary hay cutting machine which is capable of cutting hay strands into lengths usable with feed mixtures, but which operates at slower speeds, and at higher conveyor speeds than prior art cutters. Such a cutter should also be capable of directing cut hay into a confined space with minimal wastage.

SUMMARY OF THE INVENTION

In the practice of the present invention, a round bale cutter has an open bale loading side and a cut hay exhaust side. The cutter includes a wheeled frame which supports an elevated platform. The platform has a rectangular frame which supports a housing with two closed ends, an open side facing the bale loading side of the cutter and which has a partially closed side with a longitudinal gap above the platform floor facing the hay exhaust side of the cutter. Within the housing the cutter includes a bale receiving area where a hay bale rests on a series of spaced, longitudinally extending slats which extend across the platform floor and which are driven in a loop by a hydraulic motor and a pair of endless chains. On the hay exhaust side of the gap, a generally L-shaped flange extends outward and downward from the gap to form a hay reprocessing chamber which is positioned outside of and partially covers the gap. A rotary cutting drum is supported on a drive shaft which extends from end to end of the housing, with the cutting drum being positioned in the gap below the housing exhaust side wall. The conveyor slats grasp and rotate the round bale about a longitudinal axis while simultaneously urging a portion of the bale perimeter against the rotary cutting drum. The cutting drum includes a plurality of knives arrayed in a spiral pattern along its surface which, due to the rotation of the rotary drum at a much higher speed than the bale, causes the knives to chop the hay bale into individual strands for livestock feed. As the hay is chopped, the chopped hay strands are propelled into the hay reprocessing chamber where they bounce back and hit the rotary drum knives again. The twice cut strands, which are small enough to be used in feed mixing operations, are then expelled through a side opening in the hay reprocessing chamber via which they can be directed into a feed bin or mixing chamber. Due to the double hay cutting provided by the hay reprocessing chamber, the speed of the rotary cutting drum can be cut in half or less in comparison with prior art rotary cutting drums, and, thus, the horsepower required to drive the drum is considerably reduced. In addition, the speed of the conveyor slats can be increased while still achieving satisfactory strand lengths. The cutter also includes a hydraulically actuated bale lift mechanism positioned proximate and pivotably attached to the cutter on the hay loading side which lift mechanism is selectively operable to lift a round hay bale and deposit it into the bale receiving area of the cutter.

OBJECTS AND ADVANTAGES OF THE INVENTION

The principle objects and advantages of the present invention include: to provide an improved rotary drum bale cutter; to provide such a cutter in which a round hay bale can be rapidly and efficiently chopped into manageable portions for efficiently feeding livestock; to provide such a cutter in which a round bale can be chopped into short enough strands for use in feed mixing operations; to provide such a cutter with a drum which can be operated at significantly lower speeds than equivalent prior art bale cutters, thus requiring lower horsepower drives; to provide such a cutter which includes a pair of hydraulically actuated lift arms positioned to lift a round bale into the housing of the cutter; and to provide such a cutter which is rugged, reliable, capable of a long life, and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged, fragmentary, schematic cross-sectional view of the bale cutter of FIG. 1, taken along line 2—2 of FIG. 1, and illustrating knives on a rotary drum cutting a hay bale and with cut strands being propelled into the hay reprocessing chamber where they are again cut by the drum knives.

DETAILED DESCRIPTION OF THE INVENTION

I. Introduction and Environment

Figure 1:
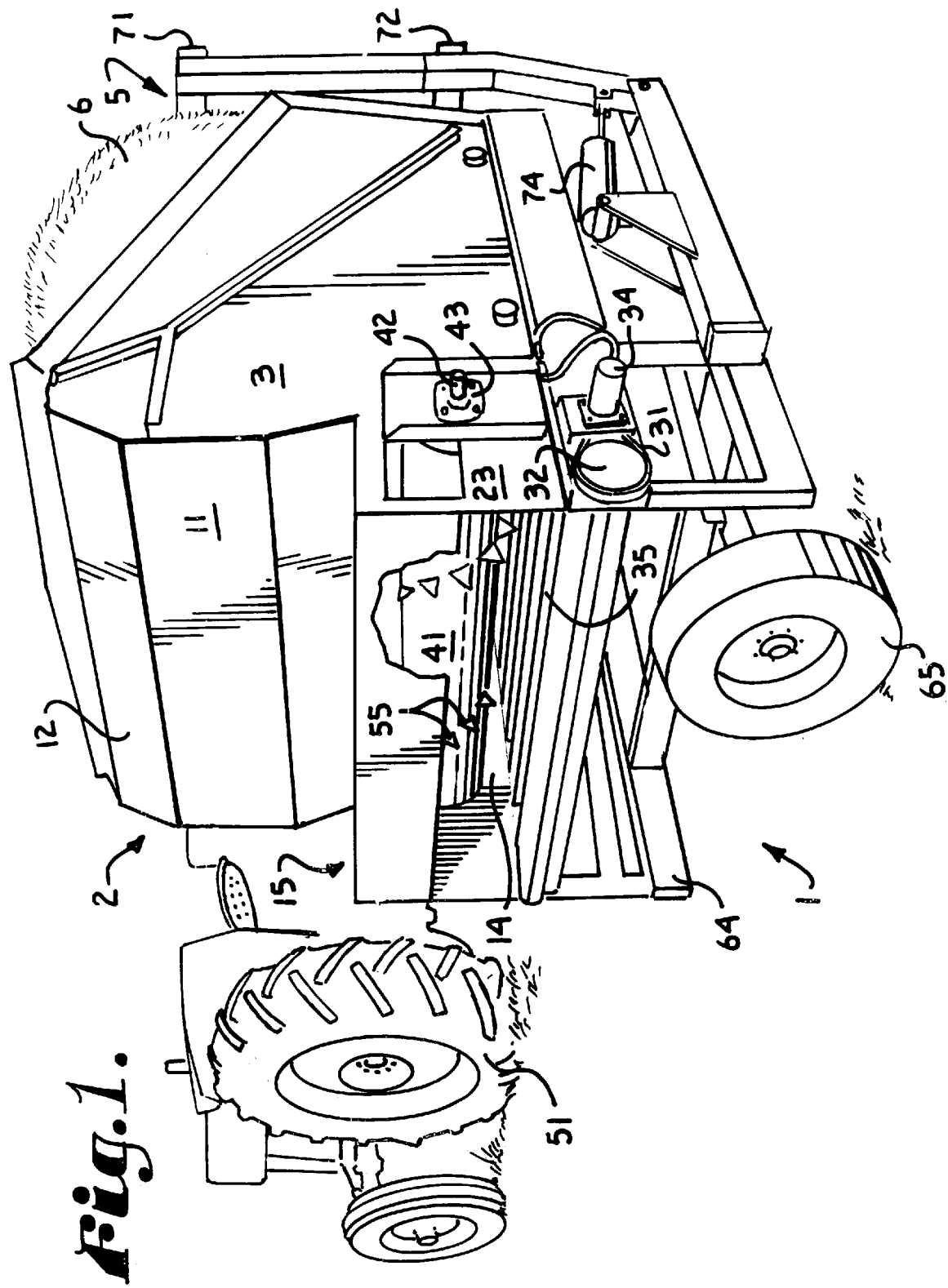
FIG. 1 is a left rear perspective view of a rotary drum round bale cutter in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up", "down", "right" and "left" will refer to directions in the drawings to which reference is made. Said terminology will include the words specifically mentioned, derivatives thereof and words of a similar import.

2. Round Bale Cutter with Hay Reprocessing Chamber

Referring to the drawings in more detail the reference numeral 1 in FIG. 1 generally designates a rotary drum bale cutter in accordance with the invention. The cutter 1 includes a housing 2 with two opposing end walls 3 and 4. The housing 2 is open at a bale loading side 5 for convenient loading of round hay bales, such as the bale 6 into a hay bale receiving area 7. The housing 2 has a hay exhaust side 11 opposite the loading side 5, which includes a segmented, contoured wall 12 which is attached between the end walls 3 and 4. The contoured wall 12 terminates a considerable distance above a floor 13 of the cutter 1, leaving a gap 14 between the floor 13 and the bottom of the curved wall 12. A hay reprocessing chamber 15, which is generally L-shaped in cross section, is formed by a substantially horizontal plate 21 attached to and extending outward from the bottom of the slated wall 12. A substantially vertical plate 22 extends downward from the horizontal plate 21. A pair of end plates 23 and 24 are attached to both the horizontal plate 21 and the vertical plate 22 so that the entire assembly of horizontal plate 21, vertical plate 22 and end plates 23 and 24 form the box-like hay reprocessing chamber 15.

The cutter 1 includes an endless chain 31 which is driven in a loop by a pair of sprockets 32. One of the sprockets 32 is, in turn, driven by a pulley (not shown) attached to a hydraulic motor 34. A number of longitudinally extending slats 35 are attached to the chain 31. The chain 31 drives the slats 35 in a counter clockwise loop over the floor 13 of the cutter 1 returning them beneath the floor 13. The slats 35 are similarly connected to a matching endless chain (not shown) at the opposite end of the cutter 1. As the slats 35 move over the floor 13, they grasp the bale 6 and rotate it clockwise, again as shown in FIG. 3, while urging a portion of the bale 6 against a rotary drum 41.

Figure 2:
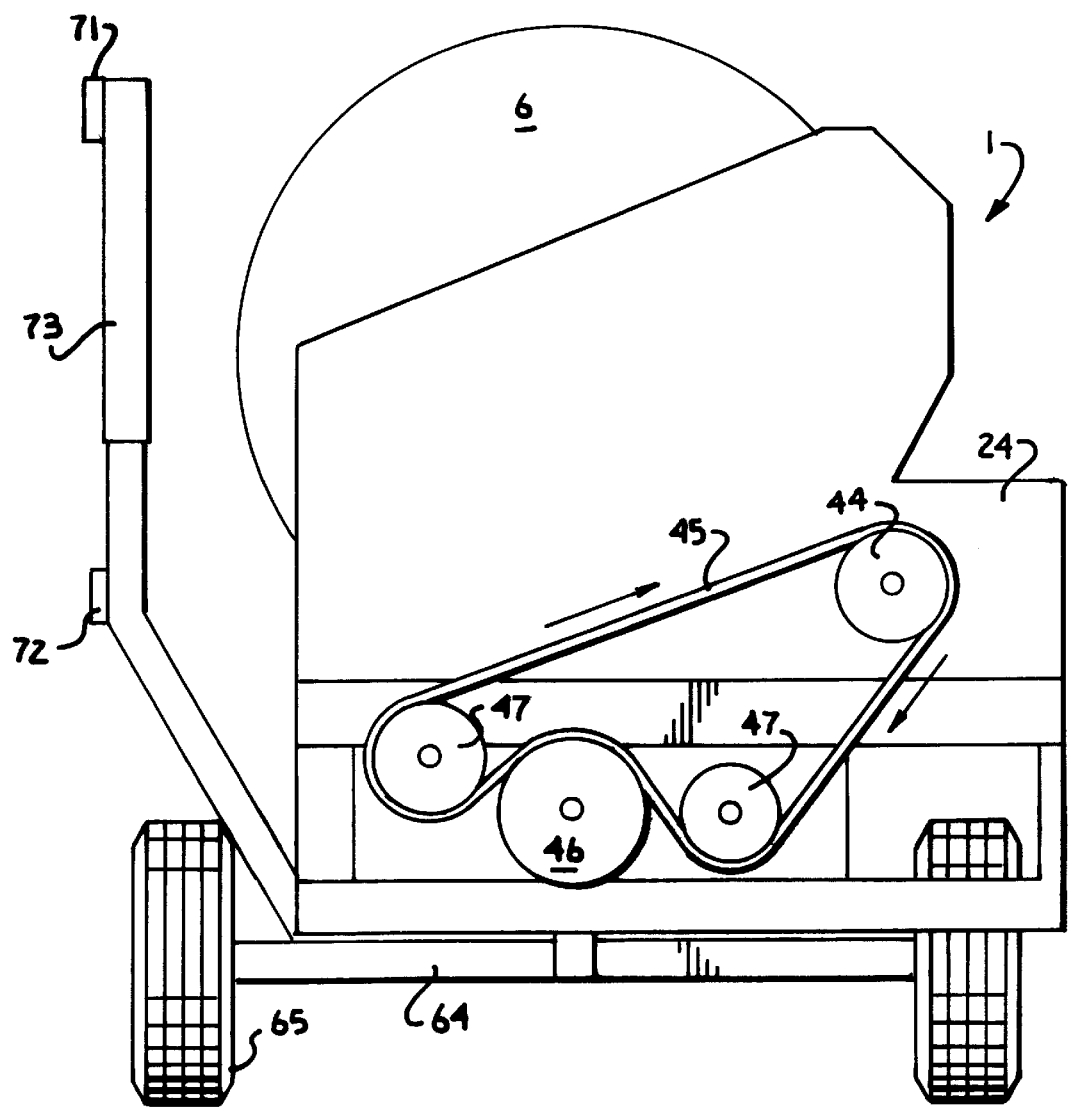
FIG. 2 is a partially schematic front elevational view of the rotary drum bale cutter with hay reprocessing chamber.

The rotary drum 41 is attached to a rotatable drive shaft 42 which extends longitudinally below the bottom of the curved wall 12 and between respective bearings 43 in each of the end walls 3 and 4. The shaft 42 is connected to a pulley 44 (FIG. 2) which is connected via a drive belt 45 to a pulley 46. A pair of idler pulleys 47 are provided to reverse the normal counterclockwise (FIG. 2) direction of rotation of a PTO shaft (not shown) to which the pulley 46 is attached to and driven by. For example, a relatively small agricultural tractor, e.g. on the order of 50 horsepower, such as the tractor 51, can provide a suitable PTO drive mechanism.

The rotary drum 41 includes a plurality of knives 55 attached and extending upward therefrom, with the knives 55 being arrayed in a spiral pattern about the periphery of the drum 41. The shaft 42 is driven in a counter clockwise direction (FIGS. 1 and 3) by the pulley 44 (FIG. 2), thus driving the drum 41 and the knives 55 in the same direction.

As the hay bale 6 is pulled into contact with the rotary drum 41 via the slats 35, the knives 55 cut the bale 6 into individual strands of hay 61 which are propelled over the drum 41 through the gap 14 and into the hay reprocessing chamber 15. The cut strands 61 deflect off of the horizontal plate 21 and the vertical plate 22 within the chamber 15 and remain in the hay reprocessing chamber 15 long enough to be cut again by the knives 55. The initial longer strands 61 are thus cut again into shorter strands 62, which are propelled out of a horizontal slot 63 in the hay reprocessing chamber 15 from whence they can be easily directed into a feed bunk or mixer (not shown).

The floor 13 is attached to a frame 64 which is supported by a pair of wheels 65. A pair of lift arms 71 & 72 are pivotably attached to the frame 64 on the hay loading side 5 of the housing 2. The lift arms 71 & 72 extend longitudinally along the bale loading side 5 of the cutter 1 and are interconnected by a telescoping arm 73 with an internal hydraulic extension cylinder (not shown) such that the lift arms 71 & 72 can be separated as they are lowered. A hydraulic lifting cylinder 74 serves to selectively pivot the telescoping arm 73 relative to the cutter frame 64, along with the attached lift arms 71 & 72 so that a bale 6 can be conveniently loaded from ground level into the bale receiving area 7 of the cutter 1 via the lift arms 71 & 72. The lift arm structure is somewhat similar to that shown and described in U.S. Pat. No. 4,621,776 to Hostetler, assigned to the present assignee.

The inventive cutter 1 achieves totally unexpected results in cutting the hay strands 61, 62. Typical prior art rotary cutters, such as the cutter shown and described in U.S. Pat. No. 5,368,238, assigned to the present assignee, cut ever smaller strands of hay as the speed of rotation of the rotary drum increases. For example, in the '238 patent, a rotary cutter equipped with a concave with teeth interacting with cutting teeth on the rotary drum, as rotary drum speed increases from 650 RPM to 1600 RPM with a constant conveyor speed, average length of cut hay strands decreases by about one-half. With a cutter configured according to the present invention but without the hay reprocessing chamber 15, a rotary cutting drum speed of approximately 1080 RPM yields an average cut hay strand length of 14" to 16". With the hay reprocessing chamber 15, the inventive cutter yields an average hay strand length of approximately 8", which is suitable for about 95% of users. In addition, with the current cutter configuration including the reprocessing chamber 15, as the speed of the conveyor slats 35 is increased, the length of cut hay strands actually decreases. Thus, as slat speed is increased from 13 feet per minute to 18 feet per minute, with a constant rotary cutter drum speed of 1080 RPM, average hay strand length went from 12" down to 8". Thus, as speed of operation increases due to increased conveyor speeds, the cutting efficiency of the inventive cutter 1 also increases. The overall effect of the inventive cutter 1 is to achieve much shorter cut hay strands at a significantly lower rotary cutting drum speed (and thus lower required drive horsepower) and at a higher through-put speed due to increased conveyor slat speeds, than was achievable with conventional prior art rotary cutters.

Certain features of the inventive cutter 1 are to be considered to be examples only. For example, the generally rectangular shape of the hay reprocessing chamber 15 can be varied considerably and still achieve the desired effect. A round chamber may prove to be as efficient or more efficient at retaining hay strands than the illustrated rectangular chamber. Furthermore, the housing shape, the drive belt path and configuration, the loading arms, etc. are all changeable without affecting the viability of the invention. Accordingly, it is to be understood that while certain forms of the present invention have been illustrated and described herein, it is not to be limited to the specific forms or arrangement of parts described and shown.

What is claimed and desired to be secured by Letters Patent is as follows:

1. A rotary drum bale cutter comprising:
  a. an elevated platform with a floor;
  b. said platform including a bale loading side and a hay exhaust side and supporting a housing sized to accommodate a round hay bale in a hay bale receiving area on said floor, said housing having a gap extending the length of the cutter just above the floor between said bale receiving area and said hay exhaust side;
  c. a drum rotatably mounted to said housing, said drum having an outer curved surface which is positioned between said hay exhaust side and said hay bale receiving area, said drum being positioned proximate said hay bale receiving area within said gap;
  d. a drum rotation mechanism which is operative to rotate said drum;
  e. a plurality of knives attached to said drum, each said knife being attached to and extending outward from the outer curved surface of said drum; and
  f. a hay reprocessing chamber positioned proximate said drum on an opposite side of said drum from said hay bale receiving area, said hay reprocessing chamber being formed by:
    i. a substantially horizontal plate extending outward from an upper end of said gap; and
    ii. a substantially vertical plate attached to and extending downward from said horizontal plate, said vertical plate terminating a distance above said floor sufficient to allow cut hay to be exhausted from said exhaust side of said cutter.

2. A rotary drum bale cutter as in claim 1, and further comprising:
  a. a bale rotation conveyor which is operative to rotate a round hay bale positioned in said bale receiving area about a longitudinal axis while simultaneously urging a portion of the perimeter of the rotating round hay bale against said rotary drum.

3. A rotary drum cutter as in claim 2, wherein said bale rotation conveyor comprises:
  a. a plurality of slats extending between a pair of endless chains; and
  b. a drive mechanism which selectively drives said endless chains and said attached slats in a loop about a floor of said frame to thereby rotate said bale via said slats.

4. A rotary drum cutter as in claim 1, and further comprising:
  a. a lift mechanism which is selectively operative to lift a round hay bale and deposit it into said hay bale receiving area.

5. A rotary drum bale cutter comprising:
  a. an elevated platform with a floor;
  b. said platform including a bale loading side and a hay exhaust side and supporting a housing sized to accommodate a round hay bale in a hay bale receiving area on said floor, said housing having a gap extending the length of the cutter just above the floor between said bale receiving area and said hay exhaust side;
  c. a drum rotatably mounted to said housing, said drum having an outer curved surface which is positioned between said hay exhaust side and said hay bale receiving area, said drum being positioned proximate said hay bale receiving area and within said gap in said housing;
  d. a drum rotation mechanism which is operative to rotate said drum;
  e. a plurality of knives attached to said drum, each said knife being attached to and extending outward from the outer curved surface of said drum;
  f. a hay reprocessing chamber positioned proximate said drum on an opposite side of said drum from said hay bale receiving area, said reprocessing chamber comprising:
  g. a substantially horizontal plate extending outward from an upper end of said gap;
  h. a substantially vertical plate attached to and extending downward from said horizontal plate, said vertical plate terminating a distance above said floor sufficient to allow cut hay to be exhausted from said exhaust side of said cutter; and
  i. a bale rotation conveyor which is operative to rotate a round hay bale positioned in said bale receiving area about a longitudinal axis while simultaneously urging a portion of the perimeter of the rotating round hay bale against said rotary drum.

6. A rotary drum cutter as in claim 5, said reprocessing chamber further comprising:
  a. a pair of end walls attached at respective ends of said vertical and horizontal plates.

7. A rotary drum bale cutter comprising:
  a. an elevated platform with a floor;
  b. said platform including a bale loading side and a hay exhaust side and supporting a housing sized to accommodate a round hay bale in a hay bale receiving area on said floor, said housing having a gap extending the length of the cutter just above the floor between said bale receiving area and said hay exhaust side;

c. a drum rotatably mounted to said housing, said drum being positioned within said gap and having an outer curved surface, said drum being placed in contact with a round hay bale held in said hay bale receiving area;

d. a drum rotation mechanism which is operative to rotate said drum;

e. a plurality of knives attached to said drum, each said knife being attached to and extending outward from the outer curved surface of said drum, said knives rotating with said drum in a hay cutting path such that strands of hay are cut from a round bale in said hay bale receiving area; and f. a hay reprocessing chamber positioned proximate said drum on an opposite side of said drum from said hay bale receiving area, said hay reprocessing chamber including a wall which is positioned to intercept and deflect cut hay strands back into said hay cutting path such that the deflected hay strands are cut again by the knives.

8. A rotary drum bale cutter as in claim 7, and further comprising:

a. a bale rotation conveyor which is operative to rotate a round hay bale about a longitudinal axis while simultaneously urging a portion of the perimeter of the rotating round hay bale against said rotary drum.

9. A rotary drum cutter as in claim 8, wherein said bale rotation conveyor comprises:

a. a plurality of slats extending between a pair of endless chains; and b. a drive mechanism which selectively drives said endless chains and said attached slats in a loop about a floor of said frame to thereby rotate said bale via said slats.

10. A rotary drum cutter as in claim 7, wherein said reprocessing chamber comprises:

a. a substantially horizontal plate extending outward from an upper end of said gap; and b. a substantially vertical plate attached to and extending downward from said horizontal plate, said vertical plate terminating a distance above said floor sufficient to allow cut hay to be exhausted from said exhaust side of said cutter.

11. A rotary drum cutter as in claim 10, said reprocessing chamber further comprising:

a. a pair of end walls attached at respective ends of said vertical and horizontal plates.

12. A rotary drum cutter as in claim 7, and further comprising:

a. a lift mechanism which is selectively operative to lift a round hay bale and deposit it into said hay bale receiving area.

13. A method of cutting a round hay bale comprising the steps of:

a. rotating the hay bale while urging it against a rotating cutter drum, said cutting drum including a plurality of knives which rotate through a cutting path;

b. positioning a hay reprocessing chamber on a side of the cutter drum opposite the hay bale, said reprocessing chamber including at least one substantially vertically oriented wall which is positioned to intercept and deflect initially cut hay strands cut by the cutter drum back into the cutting path of said cutter drum knives;

c. retaining the initially cut hay strands within the reprocessing chamber where they are again cut by the rotating cutter drum knives to provide twice cut strands; and d. exhausting the twice cut strands out of the reprocessing chamber.

* * * * *